(12) United States Patent
Tian et al.

(10) Patent No.: US 11,724,350 B2
(45) Date of Patent: Aug. 15, 2023

(54) AUTOMATIC HIGH-SHEAR LOW-PRESSURE FORCE-CONTROLLED GRINDING DEVICE FOR COMPLICATED CURVED SURFACE AND MACHINING METHOD THEREOF

(71) Applicant: Shandong University of Technology, Zibo (CN)

(72) Inventors: Yebing Tian, Zibo (CN); Linguang Li, Zibo (CN); Bing Liu, Zibo (CN); Zenghua Fan, Zibo (CN)

(73) Assignee: Shandong University of Technology

(*) Notice: Subject to any disclaimer, the term of this patent is extended or adjusted under 35 U.S.C. 154(b) by 437 days.

(21) Appl. No.: 17/001,683

(22) Filed: Aug. 25, 2020

(65) Prior Publication Data

US 2021/0053173 A1 Feb. 25, 2021

(30) Foreign Application Priority Data

Aug. 25, 2019 (CN) .......................... 201910787120.3

(51) Int. Cl.
*B24B 5/16* (2006.01)
*B24B 41/04* (2006.01)
(Continued)

(52) U.S. Cl.
CPC ................ *B24B 5/16* (2013.01); *B24B 41/04* (2013.01); *B24B 41/06* (2013.01); *B24B 49/16* (2013.01);
(Continued)

(58) Field of Classification Search
CPC .. B24B 5/02; B24B 7/04; B24B 7/165; B24B 11/00; B24B 11/02; B24B 11/04;
(Continued)

(56) References Cited

U.S. PATENT DOCUMENTS 3,583,111 A * 6/1971 Volk ........................ B24B 13/01
451/490
5,071,525 A * 12/1991 Ushiyama ............... B24B 13/00
205/663
(Continued)

FOREIGN PATENT DOCUMENTS

CN 103522159 A * 1/2014 ............ B24B 29/02
CN 105666287 A * 6/2016 ............ B25J 13/085
(Continued)

OTHER PUBLICATIONS

Machine translation of CN-103522159-A (Year: 2014).*
(Continued)

*Primary Examiner* — Orlando E Aviles
*Assistant Examiner* — Robert F Neibaur
(74) *Attorney, Agent, or Firm* — Brian M. Kaufman; Robert D. Atkins; Patent Law Group: Atkins and Associated, P.C.

(57) ABSTRACT

The present invention discloses an automatic high-shear low-pressure force-controlled grinding device for a complicated curved surface and a machining method thereof, which belong to the field of complicated curved surface grinding technologies of difficult-to-machine materials. The device comprises a base, columns, an industrial robot, an electrical spindle, a force-controlled floating work holder, a workpiece chuck, a grinder plate, a six-dimensional force sensor, a rotary table, a triaxial precision displacement table, a safeguard hood, a safety door, and a pedestal. The grinder plate comprises a grinder plate substrate, a press plate, a lining plate, and an abrasive layer. Each module is effectively communicated, and a control system collects and processes signals as well as transmits commands to achieve automatic force-controlled grinding of the complicated curved surface. The abrasive layer of the grinder plate generates the shear
(Continued)

thickening effect; so, the material can be removed in a high-shear low-pressure grinding manner.

20 Claims, 3 Drawing Sheets

(51) Int. Cl.
| | |
|---|---|
| *B24B 41/06* | (2012.01) |
| *B24B 49/16* | (2006.01) |
| *B25J 9/00* | (2006.01) |
| *B25J 9/16* | (2006.01) |
| *B25J 11/00* | (2006.01) |
| *B25J 13/08* | (2006.01) |
| *B25J 15/00* | (2006.01) |
| *B25J 21/00* | (2006.01) |

(52) U.S. Cl.
CPC .......... *B25J 9/0018* (2013.01); *B25J 9/0096* (2013.01); *B25J 9/1633* (2013.01); *B25J 11/0065* (2013.01); *B25J 13/085* (2013.01); *B25J 15/0019* (2013.01); *B25J 21/00* (2013.01)

(58) Field of Classification Search
CPC ....... B24B 11/05; B24B 13/00; B24B 21/002; B24B 21/006; B24B 21/10; B24B 21/16; B24B 29/02; B24B 29/04; B24B 41/007; B24B 41/04; B24B 41/02; B24B 41/002; B24B 41/005; B24B 37/025; B24B 37/005; B24B 37/02; B24B 37/1012; B24B 37/16; B24B 37/22; B24B 37/24; B24B 37/245; B24B 37/26; B24B 37/30; B24B 9/14–148; B25J 11/0065; B25J 15/0047; B25J 21/00
USPC ... 451/5, 278, 279, 294, 360, 361, 388, 405, 451/413, 451, 455, 526, 530, 532, 536, 451/538
See application file for complete search history.

(56) References Cited

U.S. PATENT DOCUMENTS

| | | | | |
|---|---|---|---|---|
| 6,077,148 | A * | 6/2000 | Klein | B24B 37/02 |
| | | | | 451/65 |
| 6,116,996 | A * | 9/2000 | Yanase | B24B 45/006 |
| | | | | 451/508 |
| 6,733,369 | B1* | 5/2004 | Stacklies | B23Q 1/52 |
| | | | | 451/384 |
| 6,743,085 | B2* | 6/2004 | Fritz | B24B 45/006 |
| | | | | 451/308 |
| 7,384,328 | B2* | 6/2008 | Panfili | B24B 55/10 |
| | | | | 451/344 |
| 8,715,040 | B2* | 5/2014 | Gao | B24B 41/06 |
| | | | | 901/30 |
| 9,004,979 | B2* | 4/2015 | Tuecks | B32B 25/10 |
| | | | | 451/526 |
| 10,081,089 | B2* | 9/2018 | Kottbus | B24B 27/0038 |
| 10,890,536 | B2* | 1/2021 | Wagner | B08B 1/00 |
| 10,987,806 | B2* | 4/2021 | Sakai | B25J 9/1664 |
| 2014/0106647 | A1* | 4/2014 | Kang | B24B 49/16 |
| | | | | 451/65 |
| 2016/0089789 | A1* | 3/2016 | Sato | B25J 13/088 |
| | | | | 700/254 |
| 2016/0325400 | A1* | 11/2016 | Murakami | B25J 9/0018 |

FOREIGN PATENT DOCUMENTS

| | | | | |
|---|---|---|---|---|
| CN | 113386015 | A * | 9/2021 | |
| DE | 20314465 | U1 * | 4/2004 | ........ B24B 27/0038 |
| DE | 102016008060 | A1 * | 1/2017 | ............ B25J 13/085 |
| DE | 102018102994 | A1 * | 8/2019 | ............ B23K 26/00 |

OTHER PUBLICATIONS

Machine translation of CN-105666287-A (Year: 2016).*
Machine translation of DE-102016008060-A1 (Year: 2017).*
Machine translation of DE-102018102994-A1 (Year: 2019).*
Machine translation of CN-113386015-A (Year: 2021).*
Machine translation of DE-20314465 (Year: 2004).*

* cited by examiner

AUTOMATIC HIGH-SHEAR LOW-PRESSURE FORCE-CONTROLLED GRINDING DEVICE FOR COMPLICATED CURVED SURFACE AND MACHINING METHOD THEREOF

FIELD OF THE INVENTION

The present invention relates to the complicated curved surface grinding technologies of difficult-to-machine materials, and in particular, proposes an automatic high-shear low-pressure force-controlled grinding device for a complicated curved surface and a machining method thereof.

BACKGROUND OF THE INVENTION

With the rapid development of science and technology, there are higher and higher requirements on the material performance in the fields of mechanical engineering, electronics, communication, optics, energy, aerospace, etc. A large number of novel difficult-to-machine materials (such as titanium alloy, high-temperature alloy, ultrahigh strength steel, engineering ceramics, etc.) with excellent performances constantly emerge. Meanwhile, new challenges are proposed to precision/ultra-precision machining of these materials. Grinding as the important technical means of the precision/ultra-precision machining accounts for 30%-40% of the total machining amount, and the application is very wide. In the grinding process, the difficult-to-machine material generally has the problems of low material removal rate, severe adhesion of the surface of a grinding wheel, large grinding force, high grinding temperature, grinding burn, frequent work hardening, poor surface integrity of the workpiece, etc. In view of these problems, domestic and foreign scholars develop a large number of researches on high-speed/ultrahigh-speed grinding, high-speed deep grinding, composite grinding, discontinuous grinding theories, methods, and advanced grinder technologies based on the bonded abrasives. However, these technical problems still cannot be completely solved, and it is a challenge to grind a complicated curved surface of the difficult-to-machine material. To analyze based on the grinding mechanism, the abrasive has a large negative rake and a large cutting-edge radius; so, the generated total grinding force is huge, wherein the normal grinding force is the maximum, the strength of the difficult-to-machine material is high, and the energy required by material grinding is large. The normal grinding force is dozens even hundreds of times of that of the conventional material. However, overlarge normal grinding force is a main cause of multiple problems in the difficult-to-machine material grinding process. Therefore, the present invention proposes an automatic high-shear low-pressure force-controlled grinding device for a complicated curved surface, wherein an industrial robot and a triaxial precision displacement table are coordinated to move and match with a force control module and a developed grinder plate based on the shear thickening principle to achieve force-controlled and automatic high-shear low-pressure grinding of a complicated curved surface. The device has important theoretical significance and practical application value to high-efficiency and precise grinding of the complicated curved surface of the difficult-to-machine material.

The present invention proposes an automatic high-shear low-pressure force-controlled grinding device for a complicated curved surface and a machining method thereof. An industrial robot, a triaxial precision displacement table, and a rotary table cooperatively move to achieve automatic grinding of the complicated curved surface. A force control module is utilized to achieve the constant-force grinding. A grinder plate is proposed, wherein abrasives generate the "cluster effect" under the shear-thickening effect; micro bulges of the surface of the workpiece are removed in a high-shear low-pressure grinding manner. Therefore, it is of important theoretical and practical significance to high-efficiency and precision grinding of the complicated curved surface of the difficult-to-machine material.

SUMMARY OF THE INVENTION

The present invention proposes an automatic high-shear low-pressure force-controlled grinding device for a complicated curved surface and a machining method thereof. An industrial robot, a rotary table, and a triaxial precision displacement table cooperatively move to achieve automatic grinding of the complicated curved surface. A grinder plate is mounted on a six-dimensional force sensor and matches with a force-controlled floating work holder to precisely control the grinding force by a force control module, so as to achieve a constant-force grinding effect. The grinder plate capable of generating the shear thickening effect is provided. According to the shapes of continuous and discontinuous grinding areas of the grinder plate, the grinder plate may be classified into a planar grinder plate, a fan-shaped grinder plate, an Archimedean spiral grinder plate, and a hyperbolic grinder plate. When an abrasive layer comes into contact with the surface of workpiece, the generated "cluster effect" of abrasives contributes to increase the ratio of the tangential grinding force to the normal grinding force; so, micro bulges of the surface of the workpiece are removed in a high-shear low-pressure grinding manner. Therefore, a series of problems such as low material removal rate, grinding burn, poor surface integrity, etc. in the complicated curved surface grinding process are effectively solved, and the machining efficiency and the machining quality are further improved.

The automatic high-shear low-pressure force-controlled grinding device for a complicated curved surface and the machining method thereof of the present invention provide the following technical solution:

1. The automatic high-shear low-pressure force-controlled grinding device for a complicated curved surface comprises an industrial robot base, an industrial robot, a safeguard hood, columns, an electrical spindle, a force-controlled floating work holder, a workpiece chuck, a grinder plate, a six-dimensional force sensor, a rotary table, a triaxial precision displacement table, a safety door, and a pedestal. The grinder plate comprises inner hexagon bolts, a press plate, an abrasive layer, a lining layer, and a grinder plate substrate. The abrasive layer comprises longitude and latitude woven fiber fabric, abrasives, additives, dispersed phases, and dispersion mediums. One end of the rotary table is fixed to the triaxial precision displacement table, and the other end is connected with the six-dimensional force sensor. The triaxial precision displacement table is fastened to the pedestal. The grinder plate is mounted on the six-dimensional force sensor through a bolt group. A to-be-machined workpiece is mounted on the workpiece chuck. The workpiece chuck is mounted at one end of the force-controlled floating work holder, and the other end is connected with the tail end of the industrial robot through the electrical spindle. The industrial robot and the industrial robot base are connected. All modules are coordinated with each other to achieve the motion with the complicated curved surface track. The lining layer is connected with the grinder plate substrate in a connection method. The press plate presses the abrasive layer on the lining layer and the grinder plate substrate through the inner hexagon bolts. The automatic high-shear low-pressure force-controlled grinding device for a complicated curved surface is protected by the safeguard hood. The grinder plate and the to-be-machined workpiece are mounted or changed through the safety door.

2. The machining method of a complicated curved surface by using the automatic high-shear low-pressure force-controlled grinding device for a complicated curved surface can be achieved by the following steps:

(1), opening the safety door on one side of the safeguard hood, mounting the to-be-machined workpiece on the workpiece chuck, and completing the location and the clamping of the to-be-machined workpiece;

(2), attaching the abrasive layer to the lining layer, and fastening the press plate on the grinder plate substrate through the inner hexagon bolts;

(3), mounting the grinder plate on the six-dimensional force sensor, wherein the mounting of a grinding tool is completed at this time;

(4), adjusting the to-be-machined workpiece to the grinding area by the industrial robot and the triaxial precision displacement table, and adjusting the to-be-machined workpiece to be in contact with the abrasive layer;

(5), after preparations before machining are completed, closing the safety door;

(6), turning on the device, wherein the electrical spindle drives the to-be-machine workpiece to rotate at high speed, the rotary table drives the grinder plate to rotate at low speed, the triaxial precision displacement table drives the grinder plate to achieve three-dimensional movement, and the industrial robot coordinately moves to achieve the motion with the complicated curved surface track;

(7), in the grinding process, by the control system, analyzing and processing a force signal collected by the six-dimensional force sensor and transmitting adjustment commands to the force-controlled floating work holder to achieve the constant-force grinding of the to-be-machined workpiece;

(8), achieving high-shear low-pressure grinding of the to-be-machined workpiece, wherein the abrasive layer of the grinder plate is the flexible abrasive layer, so, when it is in contact with the to-be-machined workpiece in the grinding process, it generates a shear thickening effect, and the generated "cluster effect" of abrasives contributes to increase the ratio of the tangential grinding force to the normal grinding force.

The present invention has the following remarkable effects: 1, According to the automatic high-shear low-pressure force-controlled grinding device for a complicated curved surface of the present invention, the to-be-machined workpiece is clamped on the industrial robot, the grinder plate is mounted on the triaxial precision displacement table, and they are coordinated with each other to move to complete the automatic grinding of the complicated curved surfaces of the difficult-to-machine materials. 2, The grinder plate is mounted on the six-dimensional force sensor and matches with the force-controlled floating work holder at the tail end of the industrial robot to achieve the constant-force grinding by utilizing the force control module, thereby improving the machining homogeneity. 3, According to the shapes of continuous and discontinuous grinding areas of the grinder plate, the grinder plate may be classified into the planar grinder plate, the fan-shaped grinder plate, the Archimedean spiral grinder plate, and the hyperbolic grinder plate. The abrasive layer is fixed and spreads out through the press plate and the inner hexagon bolts so that the grinding tool is simple and convenient to be detached. 4, When the abrasive layer in the grinder plate comes into contact with the surface of the workpiece, the abrasives generate the "cluster effect" to have a high ratio of the tangential grinding force to the normal grinding force to achieve the high-shear low-pressure grinding. 5, The automatic high-shear low-pressure force-controlled grinding device for a complicated curved surface is protected by the safeguard hood. The grinder plate and the to-be-machined workpiece are mounted or changed through the safety door.

DETAILED DESCRIPTION OF THE DRAWINGS

Figure 6:
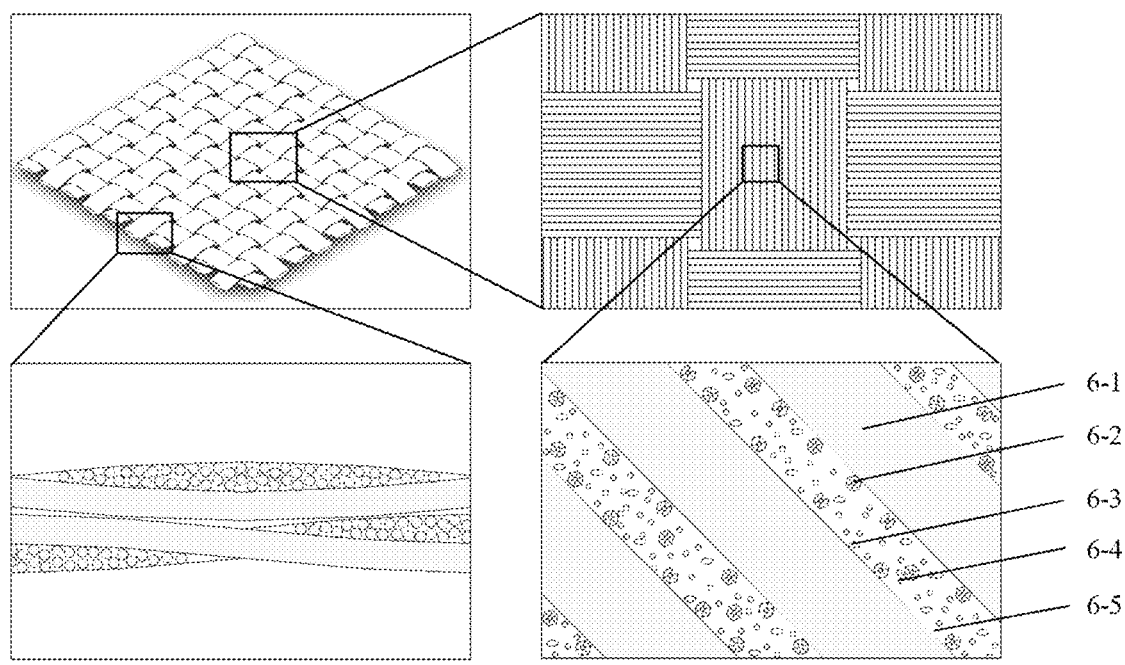
FIG. 6 is a schematic diagram showing constituents of an abrasive layer in an automatic high-shear low-pressure force-controlled grinding device for a complicated curved surface of the present invention. Wherein 6-1—longitude and latitude woven fiber fabric, 6-2—abrasives, 6-3—additives, 6-4—dispersed phases, and 6-5—dispersion mediums.

Embodiment 1: It is described in detail with reference to FIG. 1, FIG. 2, and FIG. 6 that a device in the present invention comprises an industrial robot base 1-1, a safeguard hood 1-2, columns 1-3, an industrial robot 1-4, an electrical spindle 1-5, a force-controlled floating work holder 1-6, a workpiece chuck 1-7, a grinder plate 1-9, a six-dimensional force sensor 1-10, a rotary table 1-11, a triaxial precision displacement table 1-12, a safety door 1-13, and a pedestal

1-14. The structure of the grinder plate 1-9 comprises inner hexagon bolts 2-1, a press plate 2-2, an abrasive layer 2-3, a lining layer 2-4, and a grinder plate substrate 2-5. The abrasive layer 2-3 comprises longitude and latitude woven fiber fabric 6-1, abrasives 6-2, additives 6-3, dispersed phases 6-4, and dispersion mediums 6-5. The workpiece chuck 1-7 of the grinding device is mounted on the force-controlled floating work holder 1-6 and is connected with one end of the industrial robot 1-4 through the electric spindle 1-5. The industrial robot 1-4 and the industrial robot base 1-1 are connected. The grinder plate 1-9 is connected with the six-dimensional force sensor 1-10; the rotary table 1-11 is connected with the triaxial precision displacement table 1-12. The six-dimensional force sensor 1-10 is mounted on the rotary table 1-11. The triaxial precision displacement table 1-12 is fastened to the pedestal 1-14. The lining layer 2-4 of the grinder plate 1-9 matches with the upper surface of the grinder plate substrate 2-5. The abrasive layer 2-3 covers the lining layer 2-4. The press plate 2-2 tensions and presses the abrasive layer 2-3 on the grinder plate substrate 2-5 by the inner hexagon bolts 2-1 in a threaded connection manner. The grinding device is protected by the safeguard hood 1-2. Grinding tools and the workpiece are changed through the safety door 1-13.

Embodiment 2: It is described in detail with reference to FIG. 1 and FIG. 2 that the safeguard hood 1-2 and the safety door 1-13 are fabricated by transparent materials such as acrylic plates, organic glass plate, etc.

Embodiment 3: It is described in detail with reference to FIG. 2, FIG. 3, FIG. 4, and FIG. 5 that: according to the shapes of continuous and discontinuous grinding areas of the grinder plate, the grinder plate may be classified into a planar grinder plate, a fan-shaped grinder plate, an Archimedean spiral grinder plate, and a hyperbolic grinder plate. Materials of the press plate and the grinder plate substrate may be aluminum alloy, carbon structural steel, carbon tool steel, alloy structural steel, alloy tool steel, or stainless steel.

Embodiment 4: A preparation method of the abrasive layer 2-3 in the grinder plate is described in detail with reference to FIG. 6. The method comprises the steps: respectively weighing quantitative abrasives 6-2, additives 6-3, dispersed phases 6-4, and dispersion mediums 6-5; fully mixing the above weighed materials by using mechanical stirring with the assistance of ultrasonic wave to prepare a shear-thickening abrasive dispersion system; removing bubbles in the shear-thickening abrasion dispersion system by vacuum drying; diluting the shear-thickening abrasion dispersion system by using absolute alcohol; dipping the longitude and latitude woven fiber fabric 6-1 in the diluted abrasive dispersion system; finally, putting the dipped longitude and latitude woven fiber fabric 6-1 into a blast drying oven to dry to obtain the abrasive layer 2-3.

Embodiment 5: It is described with reference to FIG. 1 that the industrial robot 1-4 of the embodiment has six degrees of freedom and matches with the triaxial precision displacement table 1-12 to achieve the motion with the complicated curved surface track. The industrial robot selects the ABB IRB 4600-60/2.05, its payload is 60 kg, and the maximum working range is 2050 mm.

Embodiment 6: It is described with reference to FIG. 1 that the force-controlled floating work holder 1-6 of the embodiment selects a spindle floating grinding head MDA350, its compliance force varying range is 8-55 N, and the maximum compliance force is 200.00 N. The rotation direction is a clockwise direction. The noise level is 79 dB (A). The floating grinding of the to-be-machined workpiece 1-8 can be achieved.

Embodiment 7: It is described with reference to FIG. 1 that the six-dimensional force sensor 1-10 of the embodiment can achieve grinding force signal collection in the grinding process of the to-be-machined workpiece 1-8. The six-dimensional force sensor selects the ATI Delta SI-660-60.

Figure 1:
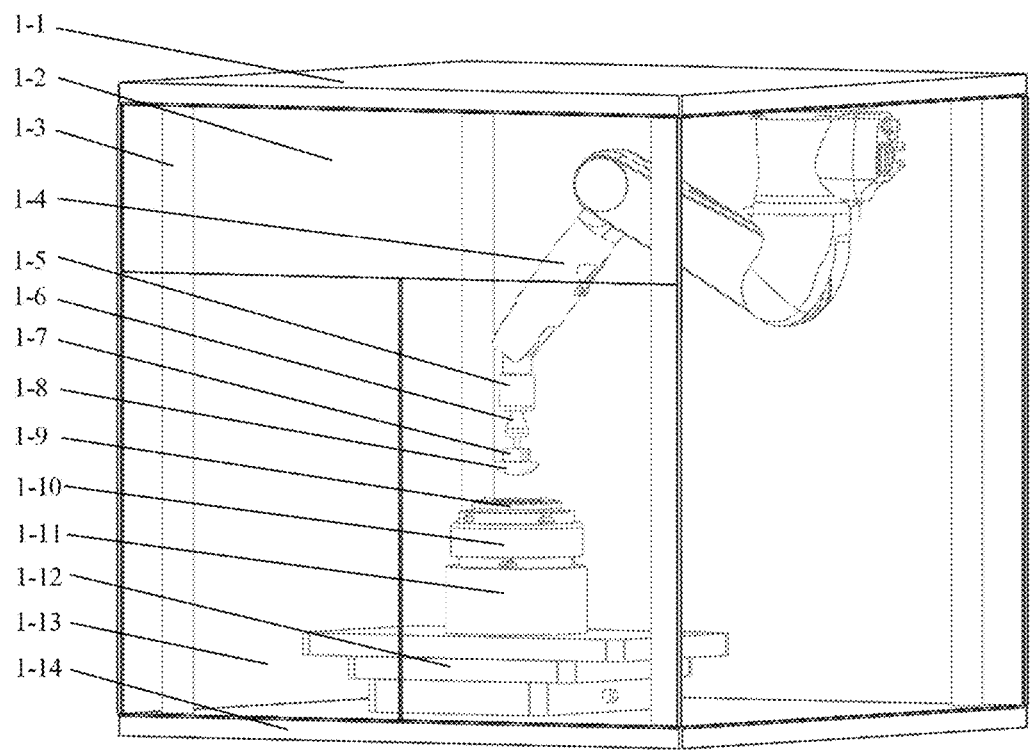
FIG. 1 is a schematic diagram showing an overall structure of an automatic high-shear low-pressure force-controlled grinding device for a complicated curved surface of the present invention. Wherein 1-1—industrial robot base, 1-2—safeguard hood, 1-3—column, 1-4—industrial robot, 1-5—electrical spindle, 1-6—force-controlled floating work holder, 1-7—workpiece chuck, 1-8—to-be-machined workpiece, 1-9—grinder plate, 1-10—six-dimensional force sensor, 1-11—rotary table, 1-12—triaxial precision displacement table, 1-13—safety door, and 1-14—pedestal.
Figure 2:
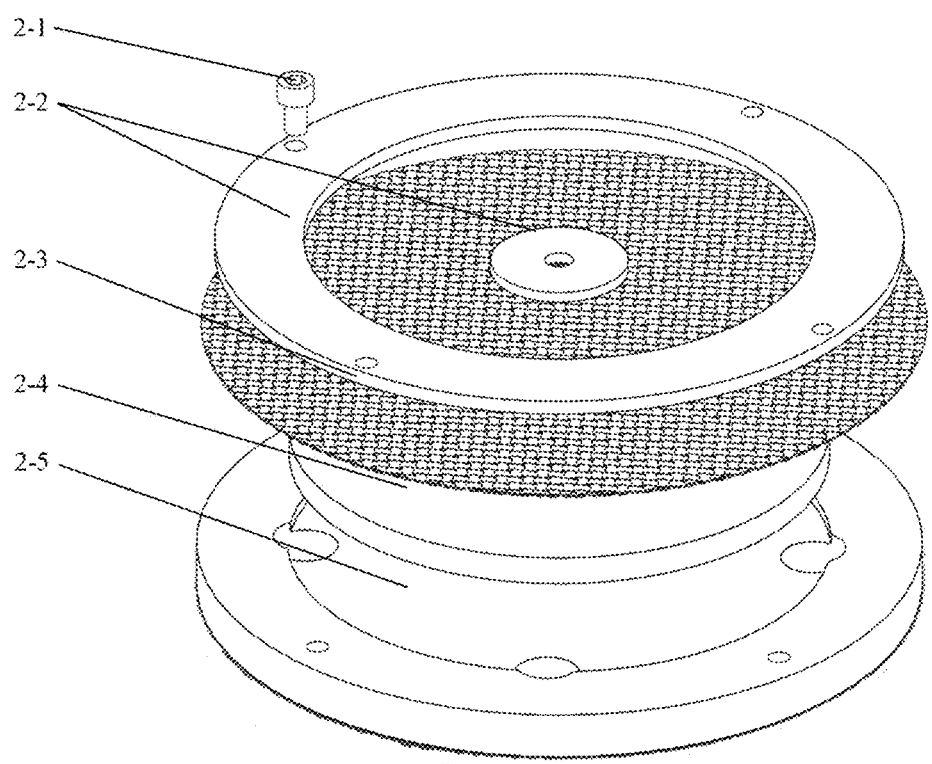
FIG. 2 is a schematic diagram showing a composition structure of a planar grinder plate in an automatic high-shear low-pressure force-controlled grinding device for a complicated curved surface of the present invention. Wherein 2-1—inner hexagon bolt, 2-2—press plate, 2-3—abrasive layer, 2-4—lining layer, and 2-5—grinder plate substrate.
Figure 3:
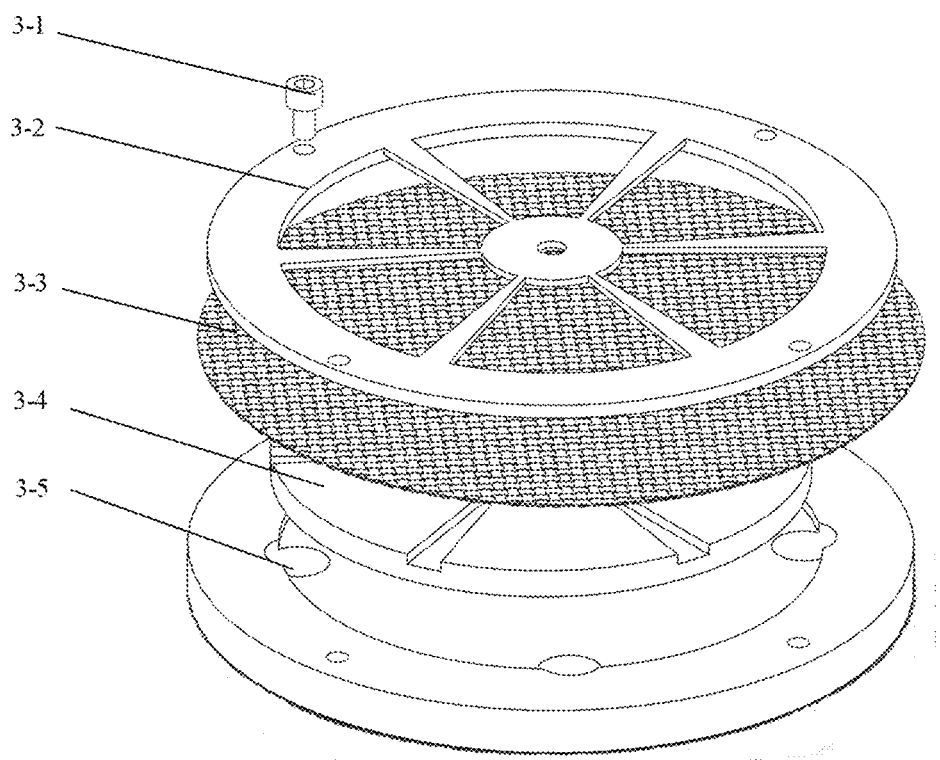
FIG. 3 is a schematic diagram showing a composition structure of a fan-shaped grinder plate in an automatic high-shear low-pressure force-controlled grinding device for a complicated curved surface of the present invention. Wherein 3-1—inner hexagon bolt, 3-2—press plate, 3-3—abrasive layer, 3-4—lining layer, and 3-5—grinder plate substrate.
Figure 4:
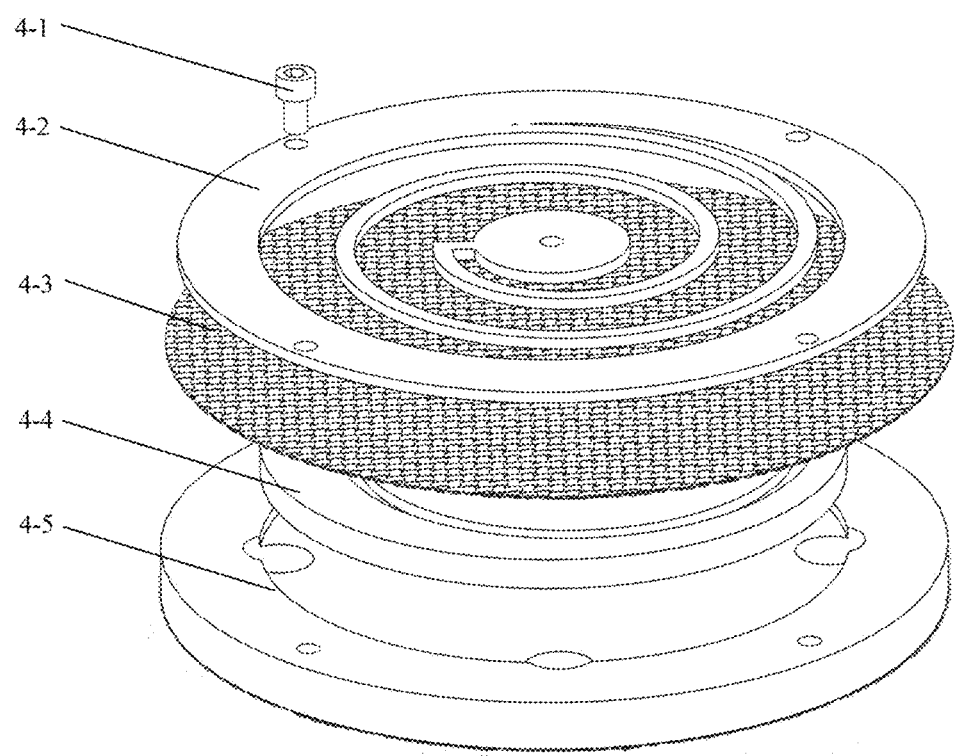
FIG. 4 is a schematic diagram showing a composition structure of an Archimedean spiral grinder plate in an automatic high-shear low-pressure force-controlled grinding device for a complicated curved surface of the present invention. Wherein 4-1—inner hexagon bolt, 4-2—press plate, 4-3—abrasive layer, 4-4—lining layer, and 4-5—grinder plate substrate.
Figure 5:
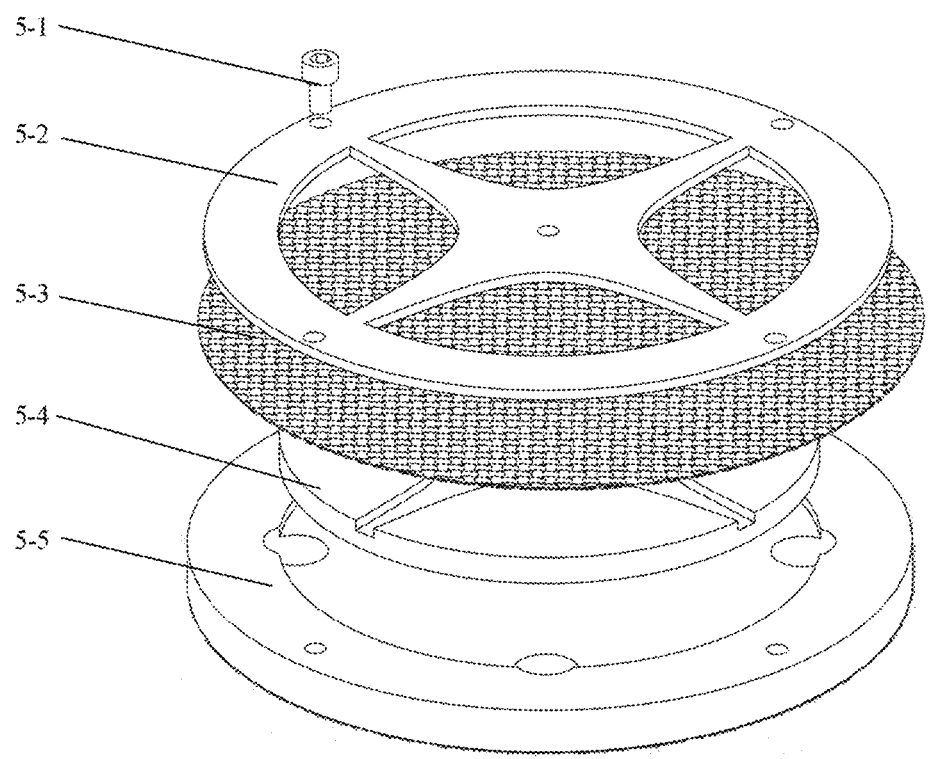
FIG. 5 is a schematic diagram showing a composition structure of a hyperbolic grinder plate in an automatic high-shear low-pressure force-controlled grinding device for a complicated curved surface of the present invention. Wherein 5-1—inner hexagon bolt, 5-2—press plate, 5-3—abrasive layer, 5-4—lining layer, and 5-5—grinder plate substrate.

Embodiment 8: with reference to FIG. 1, FIG. 2, and FIG. 3, the embodiment utilizes Embodiment 1, Embodiment 2, Embodiment 3, Embodiment 4, Embodiment 5, Embodiment 6, or Embodiment 7 to conduct force-controlled grinding on a complicated curved surface by the following steps:

(1), opening the safety door 1-13 on one side of the safeguard hood 1-2, mounting the to-be-machined workpiece 1-8 on the workpiece chuck 1-7, and completing the location and the clamping of the to-be-machined workpiece;

(2), attaching the abrasive layer 2-3 to the lining layer 2-4, and fastening the press plate 2-2 on the grinder plate substrate 2-5 through the inner hexagon bolts 2-1;

(3), mounting the grinder plate 1-9 on the six-dimensional force sensor 1-10, wherein the mounting of a grinding tool is completed at this time;

(4), adjusting the to-be-machined workpiece 1-8 to the grinding area by the industrial robot 1-4 and the triaxial precision displacement table 1-12, and adjusting the to-be-machined workpiece 1-8 to be in contact with the abrasive layer 2-3;

(5), after preparations before machining are completed, closing the safety door 1-13;

(6), turning on the device, wherein the electrical spindle 1-5 drives the to-be-machine workpiece 1-8 to rotate at high speed, the rotary table 1-11 drives the grinder plate 1-9 to rotate at low speed, the triaxial precision displacement table 1-12 drives the grinder plate 1-9 to achieve three-dimensional movement, and the industrial robot 1-4 coordinately moves to achieve the motion with the complicated curved surface track;

(7), in the grinding process, by the control system, analyzing and processing a force signal collected by the six-dimensional force sensor 1-10 and transmitting adjustment commands to the force-controlled floating work holder 1-6 to achieve the constant-force grinding of the to-be-machined workpiece 1-8;

(8), achieving high-shear low-pressure grinding of the to-be-machined workpiece 1-8, wherein the abrasive layer of the grinder plate 1-9 is the flexible abrasive layer, so, when it is in contact with the to-be-machined workpiece 1-8 in the grinding process, it generates the shear thickening effect, and the generated "cluster effect" of abrasives contributes to increase the ratio of the tangential grinding force to the normal grinding force.

What is claimed is:

1. An automatic high-shear low-pressure force-controlled grinding device for a curved surface, comprising: an industrial robot base (1-1), a safeguard hood (1-2), columns (1-3), an industrial robot (1-4), an electrical spindle (1-5), a force-controlled floating work holder (1-6), a workpiece chuck (1-7), a grinder plate (1-9), a six-dimensional force sensor (1-10), a rotary table (1-11), a triaxial precision displacement table (1-12), a safety door (1-13), and a pedestal (1-14); wherein the structure of the grinder plate (1-9) comprises inner hexagon bolts (2-1), a press plate (2-2), an abrasive layer (2-3), a lining layer (2-4), and a grinder plate substrate (2-5); the abrasive layer (2-3) comprises longitude and latitude woven fiber fabric (6-1), abrasives (6-2), additives (6-3), dispersed phases (6-4), and dispersion mediums (6-5); the workpiece chuck (1-7) is mounted on the force-controlled floating work holder (1-6);

a to-be-machined workpiece (1-8) is mounted on the workpiece chuck (1-7); one end of the electrical spindle (1-5) is connected with a tail end of the industrial robot (1-4), and the other end of the electric spindle (1-5) is connected with the force-controlled floating work holder (1-6); the industrial robot (1-4) is fixed to the industrial robot base (1-1); the grinder plate (1-9) is connected with the six-dimensional force sensor (1-10); one end of the rotary table (1-11) is connected with the triaxial precision displacement table (1-12), and the other end of the rotary table (1-11) is connected with the six-dimensional force sensor (1-10); the triaxial precision displacement table (1-12) is fixed to the pedestal (1-14); the lining layer (2-4) of the grinder plate (1-9) matches with the upper surface of the grinder plate substrate (2-5); the abrasive layer (2-3) covers the lining layer (2-4); the inner hexagon bolts (2-1) and the press plate (2-2) tension and press the abrasive layer (2-3) on the grinder plate substrate (2-5); and the automatic high-shear low-pressure force-controlled grinding device for a curved surface is protected by the safeguard hood (1-2).

2. The automatic high-shear low-pressure force-controlled grinding device for a curved surface according to claim 1, wherein:
    the industrial robot (1-4), the force-controlled floating work holder (1-6), the six-dimensional force sensor (1-10), the rotary table (1-11), and the triaxial precision displacement table (1-12) in the grinding device are integrated; and
    each module is in communication and cooperatively moves under the control; so, multiple-posture adjustment of the industrial robot (1-4) is achieved, and the motion with a curved surface track is completed.

3. The automatic high-shear low-pressure force-controlled grinding device for a curved surface according to claim 1, wherein the workpiece chuck (1-7) is connected with the force-controlled floating work holder (1-6) and matches with the six-dimensional force sensor (1-10) on the rotary table (1-11) to acquire and analyze a force signal as well as transmit an adjustment command in a grinding process in order to achieve constant-force grinding of the to-be-machined workpiece (1-8).

4. The automatic high-shear low-pressure force-controlled grinding device for a curved surface according to claim 2, wherein the workpiece chuck (1-7) is connected with the force-controlled floating work holder (1-6) and matches with the six-dimensional force sensor (1-10) on the rotary table (1-11) to acquire and analyze a force signal as well as transmit an adjustment command in a grinding process in order to achieve constant-force grinding of the to-be-machined workpiece (1-8).

5. The automatic high-shear low-pressure force-controlled grinding device for a curved surface according to claim 1, wherein:
    the grinder plate is classified into a planar grinder plate, a fan-shaped grinder plate, an Archimedean spiral grinder plate, and a hyperbolic grinder plate according to the shapes of the discontinuous grinding areas of the abrasive layer (2-3) on the grinder plate (1-9);
    the structure of the planar grinder plate comprises the inner hexagon bolts (2-1), the press plate (2-2), the abrasive layer (2-3), the lining layer (2-4), and the grinder plate substrate (2-5);
    the structure of the fan-shaped grinder plate comprises the inner hexagon bolts (3-1), the press plate (3-2), the abrasive layer (3-3), the lining layer (3-4), and the grinder plate substrate (3-5);
    the structure of the Archimedean spiral grinder plate comprises the inner hexagon bolts (4-1), the press plate (4-2), the abrasive layer (4-3), the lining layer (4-4), and the grinder plate substrate (4-5); and
    the structure of the hyperbolic grinder plate comprises the inner hexagon bolts (5-1), the press plate (5-2), the abrasive layer (5-3), the lining layer (5-4), and the grinder plate substrate (5-5).

6. The automatic high-shear low-pressure force-controlled grinding device for a curved surface according to claim 2, wherein:
    the grinder plate is classified into a planar grinder plate, a fan-shaped grinder plate, an Archimedean spiral grinder plate, and a hyperbolic grinder plate according to the shapes of the discontinuous grinding areas of the abrasive layer (2-3) on the grinder plate (1-9);
    the structure of the planar grinder plate comprises the inner hexagon bolts (2-1), the press plate (2-2), the abrasive layer (2-3), the lining layer (2-4), and the grinder plate substrate (2-5);
    the structure of the fan-shaped grinder plate comprises the inner hexagon bolts (3-1), the press plate (3-2), the abrasive layer (3-3), the lining layer (3-4), and the grinder plate substrate (3-5);
    the structure of the Archimedean spiral grinder plate comprises the inner hexagon bolts (4-1), the press plate (4-2), the abrasive layer (4-3), the lining layer (4-4), and the grinder plate substrate (4-5); and
    the structure of the hyperbolic grinder plate comprises the inner hexagon bolts (5-1), the press plate (5-2), the abrasive layer (5-3), the lining layer (5-4), and the grinder plate substrate (5-5).

7. The automatic high-shear low-pressure force-controlled grinding device for a curved surface according to claim 3, wherein:
    the grinder plate is classified into a planar grinder plate, a fan-shaped grinder plate, an Archimedean spiral grinder plate, and a hyperbolic grinder plate according to the shapes of the discontinuous grinding areas of the abrasive layer (2-3) on the grinder plate (1-9);
    the structure of the planar grinder plate comprises the inner hexagon bolts (2-1), the press plate (2-2), the abrasive layer (2-3), the lining layer (2-4), and the grinder plate substrate (2-5);
    the structure of the fan-shaped grinder plate comprises the inner hexagon bolts (3-1), the press plate (3-2), the abrasive layer (3-3), the lining layer (3-4), and the grinder plate substrate (3-5);
    the structure of the Archimedean spiral grinder plate comprises the inner hexagon bolts (4-1), the press plate (4-2), the abrasive layer (4-3), the lining layer (4-4), and the grinder plate substrate (4-5); and
    the structure of the hyperbolic grinder plate comprises the inner hexagon bolts (5-1), the press plate (5-2), the abrasive layer (5-3), the lining layer (5-4), and the grinder plate substrate (5-5).

8. The automatic high-shear low-pressure force-controlled grinding device for a curved surface according to claim 1, wherein:
    the abrasive layer (2-3) comprises the longitude and latitude woven fiber fabric (6-1), the abrasives (6-2), the additives (6-3), the dispersed phases (6-4), and the dispersion mediums (6-5); and
    when the to-be-machined workpiece (1-8) comes into contact with the grinder plate (1-9), the abrasive layer (2-3) generates a shear thickening effect, and the abrasives generate a cluster effect, resulting in a high ratio of a tangential grinding force to a normal grinding force.

9. The automatic high-shear low-pressure force-controlled grinding device for a curved surface according to claim 2, wherein:
the abrasive layer (2-3) comprises the longitude and latitude woven fiber fabric (6-1), the abrasives (6-2), the additives (6-3), the dispersed phases (6-4), and the dispersion mediums (6-5); and
when the to-be-machined workpiece (1-8) comes into contact with the grinder plate (1-9), the abrasive layer (2-3) generates a shear thickening effect, and the abrasives generate a cluster effect, resulting in a high ratio of a tangential grinding force to a normal grinding force.

10. The automatic high-shear low-pressure force-controlled grinding device for a curved surface according to claim 3, wherein:
the abrasive layer (2-3) comprises the longitude and latitude woven fiber fabric (6-1), the abrasives (6-2), the additives (6-3), the dispersed phases (6-4), and the dispersion mediums (6-5); and
when the to-be-machined workpiece (1-8) comes into contact with the grinder plate (1-9), the abrasive layer (2-3) generates a shear thickening effect, and the abrasives generate a cluster effect, resulting in a high ratio of a tangential grinding force to a normal grinding force.

11. The automatic high-shear low-pressure force-controlled grinding device for a curved surface according to claim 5, wherein:
the abrasive layer (2-3) comprises the longitude and latitude woven fiber fabric (6-1), the abrasives (6-2), the additives (6-3), the dispersed phases (6-4), and the dispersion mediums (6-5);
when the to-be-machined workpiece (1-8) comes into contact with the grinder plate (1-9), the abrasive layer (2-3) generates a shear thickening effect, and the abrasives generate a cluster effect, resulting in a high ratio of a tangential grinding force to a normal grinding force.

12. The automatic high-shear low-pressure force-controlled grinding device for a curved surface according to claim 1, wherein the abrasive layer (2-3) of the grinder plate (1-9) includes longitude and latitude woven fiber fabric and is tightly pressed on the lining layer (2-4) and the grinder plate substrate (2-5) by the press plate (2-2) through the inner hexagon bolts (2-1) in a threaded connection manner.

13. The automatic high-shear low-pressure force-controlled grinding device for a curved surface according to claim 2, wherein the abrasive layer (2-3) of the grinder plate (1-9) includes longitude and latitude woven fiber fabric and is pressed on the lining layer (2-4) and the grinder plate substrate (2-5) by the press plate (2-2) through the inner hexagon bolts (2-1) in a threaded connection manner.

14. The automatic high-shear low-pressure force-controlled grinding device for a curved surface according to claim 3, wherein the abrasive layer (2-3) of the grinder plate (1-9) includes longitude and latitude woven fiber fabric and is pressed on the lining layer (2-4) and the grinder plate substrate (2-5) by the press plate (2-2) through the inner hexagon bolts (2-1) in a threaded connection manner.

15. The automatic high-shear low-pressure force-controlled grinding device for a curved surface according to claim 5, wherein the abrasive layer (2-3) of the grinder plate (1-9) includes longitude and latitude woven fiber fabric and is pressed on the lining layer (2-4) and the grinder plate substrate (2-5) by the press plate (2-2) through the inner hexagon bolts (2-1) in a threaded connection manner.

16. The automatic high-shear low-pressure force-controlled grinding device for a curved surface according to claim 8, wherein the abrasive layer (2-3) of the grinder plate (1-9) includes longitude and latitude woven fiber fabric and is pressed on the lining layer (2-4) and the grinder plate substrate (2-5) by the press plate (2-2) through the inner hexagon bolts (2-1) in a threaded connection manner.

17. The automatic high-shear low-pressure force-controlled grinding device for a curved surface according to claim 1, wherein:
the safeguard hood (1-2) is used for preventing the industrial robot (1-4), a grinding fluid, and abrasive dusts in the grinding process from damaging operators and also preventing the abrasive dusts; and
the grinder plate (1-9) and the to-be-machined workpiece (1-8) are mounted or changed through the safety door (1-13).

18. The automatic high-shear low-pressure force-controlled grinding device for a curved surface according to claim 2, wherein:
the safeguard hood (1-2) is used for preventing the industrial robot (1-4), a grinding fluid, and abrasive dusts in the grinding process from damaging operators and also preventing the abrasive dusts; and
the grinder plate (1-9) and the to-be-machined workpiece (1-8) are mounted or changed through the safety door (1-13).

19. The automatic high-shear low-pressure force-controlled grinding device for a curved surface according to claim 3, wherein:
the safeguard hood (1-2) is used for preventing the industrial robot (1-4), a grinding fluid, and abrasive dusts in the grinding process from damaging operators and also preventing the abrasive dusts; and
the grinder plate (1-9) and the to-be-machined workpiece (1-8) are mounted or changed through the safety door (1-13).

20. A machining method of a curved surface by using the automatic high-shear low-pressure force-controlled grinding device for a curved surface according to claim 1, comprising the following steps:
(1), opening the safety door (1-13) on one side of the safeguard hood (1-2), mounting the to-be-machined workpiece (1-8) on the workpiece chuck (1-7), and completing a location and clamping of the to-be-machined workpiece;
(2), attaching the abrasive layer (2-3) to the lining layer (2-4), and fastening the press plate (2-2) on the grinder plate substrate (2-5) through the inner hexagon bolts (2-1);
(3), mounting the grinder plate (1-9) on the six-dimensional force sensor (1-10), wherein the mounting of a grinding tool is completed at this time;
(4), adjusting the to-be-machined workpiece (1-8) to the grinding area by the industrial robot (1-4) and the triaxial precision displacement table (1-12), and adjusting the to-be-machined workpiece (1-8) to be in contact with the abrasive layer (2-3);
(5), closing the safety door (1-13);
(6), turning on the device, wherein the electrical spindle (1-5) drives the to-be-machine workpiece (1-8) to rotate at high speed, the rotary table (1-11) drives the grinder plate (1-9) to rotate at low speed, the triaxial precision displacement table (1-12) drives the grinder plate (1-9) to achieve three-dimensional movement, and the industrial robot (1-4) coordinately moves to achieve the motion with a curved surface track;

(7), in the grinding process, by the control system, analyzing and processing a force signal collected by the six-dimensional force sensor (1-10) and transmitting adjustment commands to the force-controlled floating work holder (1-6) to achieve the constant-force grinding of the to-be-machined workpiece (1-8), wherein the abrasive layer of the grinder plate (1-9) is the flexible abrasive layer, so, when it is in contact with the to-be-machined workpiece (1-8) in the grinding process, it generates a shear thickening effect, and a generated cluster effect of abrasives contributes to increase the ratio of a tangential grinding force to a normal grinding force.

* * * * *